Patented June 2, 1936

2,042,877

UNITED STATES PATENT OFFICE 2,042,877

METHOD OF RETARDING THE CRYSTALLIZATION OF ROSIN

Joseph N. Borglin, Hattiesburg, Miss., assignor to Hercules Powder Company, Wilmington, Del., a corporation of Delaware No Drawing. Application April 12, 1928, Serial No. 269,600

9 Claims. (Cl. 87—2)

My invention relates to a method of treating rosin for the prevention of crystallization thereof and is adaptable for the treatment of both gum and wood rosin.

As is well known, both gum and wood rosins, on storage may gradually crystallize. The presence of crystals in rosin is a serious objection to its use, since the crystallized rosin has a higher melting point than that of the uncrystallized rosin and the crystallized rosin will enter into reaction with other materials much more slowly than will uncrystallized rosin. Further, a rosin which has a tendency to crystallize, will crystallize out of rosin preparations, such, for example, as core oils comprising solutions of rosin in linseed and petroleum oils, much more readily than will rosin showing little tendency to crystallize.

Now, in accordance with my invention I am able to prevent or very materially retard the crystallization of rosin, by subjecting rosin to treatment by the addition to the rosin, or to a rosin solution, of a basic organic compound, such a pyridine, aniline, a rosin soap, etc., or by the addition of an aldehyde, such as furfural. More specifically in accordance with my invention I may add to the rosin, or to a rosin preparation, from say about 2% to about 5% either of a basic organic compound, or of an aldehyde, and while the treatment in accordance with my invention may involve the addition of a rosin soap, I may effect such addition by adding to the rosin during its manufacture an alkali, as for example, soda ash (sodium carbonate), sodium hydroxide, sodium bicarbonate, potassium hydroxide, potassium carbonate or other hydroxide, oxide, carbonate or bicarbonate of the alkali metals, oxides or hydroxides of the alkaline earth metals, such as calcium oxide, calcium hydroxide, barium hydroxide, etc., thus effecting saponification of a part of the rosin. If desired, the object of this invention may be obtained by the use of alkali soaps as, for example, fatty acid soaps as sodium stearate or potassium oleate, instead of sodium or potassium resinate.

As more specifically descriptive of the method in accordance with my invention, the following examples of the application thereof will be illustrative:

For example, a solution of rosin in gasoline, or other suitable solvent, and which solution may be that usually obtained by the extraction of disintegrated wood with gasoline, is fed to an evaporator simultaneously with a suspension of an alkali, as soda ash (2% on the rosin) in gasoline. The soda ash thus becomes intimately mixed with the rosin, a portion of which will react with the soda ash to produce a rosin soap which will be well incorporated with the rosin. In the illustration given there will be about 11.6% of soap incorporated with the rosin recovered from the evaporator. The rosin containing about 11.6% of rosin soap will, when made up into, for example, core oil, be found in solution and free from crystals after a period of three months, while similar rosin free from soap will, when made in a similar core oil, be found badly crystallized after thirteen days. As will be obvious, the rosin soap separately prepared may be incorporated with the rosin where for any reason it is not desirable or convenient to effect saponification by the addition of an alkali, as soda ash.

If desired the rosin may be treated simultaneously with the compounding of the rosin and other ingredients for the production of a core oil. For example, 40 parts (by weight) of rosin and 30 parts of raw linseed oil are melted together and to the melt is added 5 parts of soap, (in terms of dry soap) as sodium resinate and the mixture heated to about 165° C. until the water is evaporated and a homogeneous solution obtained. If desired, say about 30 parts of, for example, kerosene, containing, if desired though not necessary, about 5 parts of aniline, may be added to the rosin-linseed oil-soap solution, and the rosin will be found in solution and free from crystals after seventy-six days as compared with crystallization in about five days with similar rosin untreated. It will be appreciated that instead of adding soap to the rosin-linseed oil solution, there may be added an alkali with the production of the desired soap in the solution.

As a further illustration say 40 parts (by weight) of rosin and 30 parts of raw linseed oil are melted and brought to a temperature of about 165°C. then 30 parts of, for example, kerosene containing 5 parts of aniline are added to the rosin-linseed oil solution formed. The core oil thus produced will stand nineteen days without crystallization as compared with crystallization in five days where untreated rosin is used. The core oil produced as above may be improved so that the rosin will remain in solution without crystallization for forty-nine days by heating the rosin-linseed oil kerosene solution for a few minutes under a reflux condenser at a temperature of say 275° C.-300° C.

When it is desired to effect treatment of the rosin with an aldehyde as furfural, such may be incorporated in amounts of from 2-5% with the rosin alone or when compounding the rosin.

It will be noted from the above examples that the treatment of rosin in accordance with my invention may be effected simultaneously with the production of the rosin, or of a compound of which the rosin is an ingredient, or by treatment of the rosin as such and it will be understood that the rosin may be treated with a basic organic compound, or with a mixture of such compounds, or with an aldehyde and that where the ultimate treatment of the rosin involves a soap that such may be formed by the saponification of a part of the rosin under treatment by the addition hereto of a suitable alkali or of an alkali and a suitable saponifying oil. It will be further understood that the rosin may be subjected to treatment as such, for example, with aniline, furfural, etc. or in solution, for example, in gasoline and the like, or in linseed oil, as when compounded to form core oils, and the like and it will be understood that the subject matter of my invention is applicable to either wood rosin or gum rosin.

It will be understood that where in the claims appended hereto reference is made to linsed oil that I intend to include operable equivalents thereof.

Having now fully described my invention, what I claim and desire to protect by Letters Patent is:

1. A rosin composition substantially resistant to crystallization, which includes rosin having from about 2% to about 5% by weight of a fatty acid soap incorporated therewith.

2. The method of retarding the crystallization of rosin, which comprises adding to rosin, while in a liquid phase, a fatty acid soap in amount of from about 2% to about 5% by weight of the rosin.

3. As a new article of manufacture, a solid rosin product substantially free of crystalline abietic acid and containing a relatively small quantity of a fatty acid soap, the quantity of fatty acid soap being insufficient to change the normal physical appearance of the rosin.

4. As a new article of manufacture, wood rosin in solid form, substantially free of crystalline abietic acid and containing a small percentage of a fatty acid soap, insufficient in amount to change the normal physical appearance of the rosin.

5. The process of preparing a rosin in solid form substantially free from crystalline abietic acid, which comprises adding to rosin while in a liquid phase a relatively small quantity of a fatty acid soap, insufficient in amount to change the physical appearance of the treated rosin, and allowing the treated rosin to assume its normally solid form.

6. The process of preparing a rosin in solid form, substantially free from crystalline abietic acid, which comprises adding to a solution of rosin in a solvent therefor a relatively small quantity of a fatty acid soap, insufficient in amount to change the physical appearance of the treated rosin, and freeing the rosin of the solvent.

7. As a new article of manufacture, a solid rosin product substantially free of crystalline abietic acid and containing a relatively small quantity of a soap consisting of a sodium salt of a fatty acid, the quantity of such fatty acid soap being insufficient to change the normal physical appearance of the rosin.

8. As a new article of manufacture, a solid rosin product substantially free of crystalline abietic acid and containing a relatively small quantity of sodium oleate, the quantity of sodium oleate being insufficient to change the normal physical appearance of the rosin.

9. As a new article of manufacture, a solid rosin product substantially free of crystalline abietic acid and containing a relatively small quantity of sodium stearate, the quantity of sodium stearate being insufficient to change the normal physical appearance of the rosin.

JOSEPH N. BORGLIN.